United States Patent Office 3,565,686
Patented Feb. 23, 1971

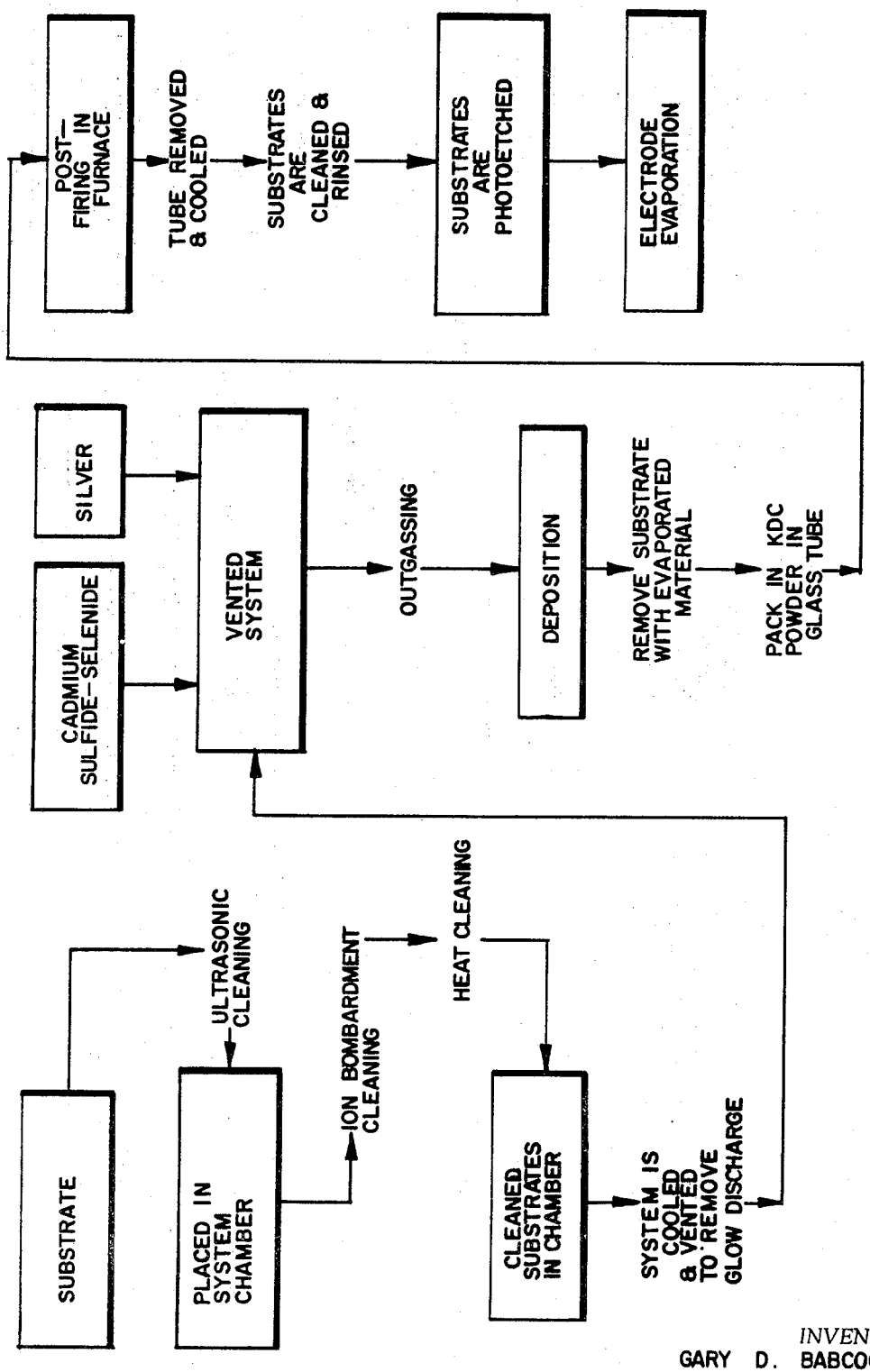

3,565,686
CADMIUM SULFIDE-SELENIDE PHOTODE-
TECTORS AND PROCESS FOR MANUFAC-
TURE THEREOF
Gary D. Babcock, Mission Viejo, and Steve Y. Muto, Cupertino, Calif., assignors to North American Rockwell Corporation
Filed Sept. 25, 1967, Ser. No. 670,358
Int. Cl. H01d 7/00
U.S. Cl. 117—227                            17 Claims

ABSTRACT OF THE DISCLOSURE

A cadmium sulfide-selenide photodetector and a process for the manufacture thereof comprising vacuum depositing cadmium sulfide, cadmium selenide and silver in predetermined ratios onto a substrate, maintaining the substrate temperature during deposition to within $\pm 1°$ C. of a value within the range from 60° C. to 85° C., maintaining the cadmium sulfide-selenide evaporation boat temperature during deposition to within $\pm 2°$ C. of a value which is greater than 850° C., and post-evaporation firing said photodetector by covering the detector with cadmium sulfide powder doped with chlorine and copper, applying heat for a predetermined period of time and maintaining the temperature of the applied heat within a range from 500° C. to 700° C.

BACKGROUND OF THE INVENTION

(1) Field of the invention

The present invention relates to cadmium sulfide-selenide photodetectors and, more specifically, to such photodetectors and to a process for the vacuum evaporation manufacture thereof.

(2) Description of the prior art

Photodetectors have long been recognized as valuable components of stellar navigation systems, imaging devices, and other general detection systems. For example, photodetectors are used on space vehicles to detect the positions of distant stars, thereby allowing a space vehicle to determine its position in space. This is done by pointing the photodetector in the general direction of a known star, and then scanning the image of the star across the photodetector. When the detector is pointing directly at the star, some of the light from the star will impinge on the detector, thereby causing the detector to generate an electrical signal. This signal is fed to processing circuitry in the navigation system which determines the vehicle's position and course.

Such navigation systems typically make use of detector arrays for more precise location of stars. By scanning the field of view of an array of detectors across the path of light from a star, the signal will increase in steps as each detector in turn is illuminated. Thus, when a peak signal is reached, the center-axis of the field of view is pointing directly at the star.

Such detector arrays, as well as mosaic detectors, are often made by photo-etching tiny grooves into the photodetective material, thereby (a) sharply isolating smaller detector elements from one another on the same substrate while (b) removing only so much of the photoconductive material as is necessary for isolation.

For the precision required in determining the location of a star in a stellar navigation system, reliance is made on the uniformity of the surface of the detector. Variations in the flatness of the detectors can give rise to spurious variations in the signals produced thereby.

Another use for photodetectors is in imaging devices which gather information about the earth or the earth's atmosphere either from a position in space or from a position on the earth's surface. Thus, clouds and other atmospheric particles as well as the earth's terrain can be studied by using photodetectors which sense the light reflected by these subjects under study.

Originally, photodetectors were made of sintered photoconducting layers which were held together by a binding material which was moisture sensitive, and, therefore, required encapsulation. Further, the process of manufacturing the sintered photo-conducting layers was such as to result in non-uniformity over small areas of the material. Because of the nature of the sintered material, such photo devices could not be readily isolated into small elements for multi-arrays or mosaics. The problem of photoetching could not be overcome in the sintered material. The particle size of the sintered material was too large. In order to photoetch at all, sandblasting through a mask was the procedure employed. However, the size of the etching grooves that could be obtained was limited by this process. Small etching grooves were not possible so that good definition of the grooves could not be achieved.

To avoid the problems attendant to sintered photodetectors, vacuum deposition techniques were used to produce photocells. The vacuum deposited layers did not result in non-uniformity over small areas as did the sintered photocells, neither did they require encapsulation to avoid moisture, since the vacuum deposited photodetectors did not require a binder in the post-evaporation firing powder. Further, vacuum deposited photodetectors could readily be isolated into small elements by photoetching, since the thin film deposited was of an amorphous nature.

While vacuum deposited photocells overcame the problems associated with sintered photocells, they introduced new problems. For example, the new photodetectors had a high operating resistivity far above the values required for proper operation; they had slow time response characteristics which would result in delays in signal processing; in many cases their resistivities were dependent upon previous exposure to light or darkness, i.e., their resistivity at a given light level depended upon whether the device had previously been exposed to a higher or lower level of light; and the characteristics of any given photodetector could not be reliably reproduced or repeated.

SUMMARY OF THE INVENTION

According to the present invention, there is provided a novel cadmium sulfide-selenide photocell which incorporates the desirable characteristics of both sintered and vacuum deposited photodetectors, and wherein the problems attendant to both are substantially overcome. By controlling the doping process, and, in particular, by controlling the proper ratio of dopant material to host material, the resistivity characteristics may be controlled and, therefore, good results can be obtained. The light history dependency of the device is also avoided by properly controlling the doping process. The slow time response characteristics are avoided by controlling the temperature tolerances during the deposition process. Finally, by properly doping, and by using the proper post-evaporation firing technique for diffusing the doping atoms into the host material after the thin film has been deposited, the reliable reproducibility and stability of the device can be insured to a large degree. Whereas before production of a photodetector of given characteristics involved a trial and error process, now the characteristics may be specified and the results reproduced.

In particular, the inventive process comprises: mixing cadmium sulfide and cadmium selenide in a particular ratio, the value of which is dependent upon the spectral response desired; maintaining the cadmium sulfide-selenide evaporation boat temperature during deposition at a value above 850° C., and to within a tolerance of ±2° C. of the selected value; maintaining the substrate temperature during deposition at a value within the range from 60° C. to 85° C., with a tolerance of ±1° C. of the selected temperature within the range; maintaining the ratio of the cadmium sulfide-selenide evaporation rate to the average silver evaporation rate at a value between 50:1 to 200:1; controlling the post-evaporation firing process by using as the post-evaporation firing powder cadmium sulfide photoconductive powder doped with chlorine to a level of at least 100 parts per million and copper to a level of at least 50 parts per million; maintaining the post-evaporation diffusion temperature between 500° C. and 700° C., with a tolerance of ±10° C.; and maintaining the post-evaporation diffusion time between 2 minutes and 2 hours with a tolerance of ±¼ minute. This post-evaporation diffusion process wherein the dopant atoms are diffused into their proper position within the host material, is a time-temperature process. Therefore, for a lower temperature, a longer diffusion time is necessary in order to achieve the same results.

OBJECTS

It is therefore an object of the present invention to provide an improved cadmium sulfide-selenide photoconductive device and a better process for making same.

It is another object of the present invention to provide a cadmium sulfide-selenide photodetector which is insensitive to moisture and humidity, and which, therefore, does not require packaging or encapsulation.

Still another object of the present invention is to provide a cadmium sulfide-selenide photocell which can be easily photoetched, thereby making it compatible with the fabrication of small multi-array devices.

It is still another object of the present invention to provide a cadmium sulfide-selenide photocell whose spectral response and resistivity characteristics can be tailored to the specific application required.

Yet a further object of the present invention is to provide a cadmium sulfide-selenide photoconductive device with a large dynamic light sensitivity range.

Another object of the present invention is to provide a process for manufacturing cadmium sulfide-selenide photoconductive devices wherein the doping variation can be accomplished in a controlled manner, and the resistivity as well as the slope of the resistivity vs. illumination curve can be controlled over a given range.

Still a further object of the present invention is to provide a process for manufacturing cadmium sulfide-selenide photoconductive devices whereby the device is stable and uniform, and its characteristics are reproducible with reasonable yield.

Still other objects, features and attendant advantages of the present invention will become apparent to those skilled in the art from a reading of the following detailed description of a preferred embodiment constructed in accordance therewith, taken in conjunction with the accompany drawings wherein:

BRIEF DESCRIPTION OF THE DRAWINGS

The sole figure shows a block diagram of the process.

DESCRIPTION OF THE PREFERRED EMBODIMENT

In accordance with the present invention, the sole figure shows a process for the vacuum evaporation of cadmium sulfide-selenide photocells.

The fabrication process of a vapor deposited thin film, and, in particular, of a vapor deposited photodetector, comprises a series of operations which are, to a significant extent, standard in the art of thin film deposition and photodetector manufacture. For example, the substrate upon which the thin film is to be deposited is first cleaned ultrasonically in a conventional cleaning solution which may be Alconox, an industrial detergent, and distilled water, for a period of typically 5 minutes. Three successive rinses normally follow the ultrasonic cleaning, the first with distilled water, the second with acetone, and the third with distilled water. Each rinse lasts 2 minutes. The substrates are blown dry with dry nitrogen gas and placed in a vacuum chamber, which is immediately pumped down to a vacuum of typically $10^{-6}$ torr. At this point, the chamber is usually flushed twice with argon gas. The flushing operation consists of filling the chamber with argon gas to atmospheric pressure and then pumping it down to $10^{-6}$ torr. After the second flushing cycle, the chamber is filled to a back pressure of 50 microns of argon gas. The substrates are then usually cleaned by ion bombardment for a period of normally 30 minutes. During the cleaning procedure, the glow discharge ring is held at a potential of 1 kilovolt.

After this process, the vacuum chamber is normally pumped down to a region of $10^{-6}$ torr. The substrates are further cleaned by heating for a period of 30 minutes at a temperature of 60° C., under a vacuum of better than $5 \times 10^{-5}$ torr. Upon completion of the heating cycle, the substrates are allowed to cool to near room temperature. The system is vented to remove the glow discharge assembly and to prepare the system for deposition.

Whereas these and other steps of the process for the vacuum evaporation manufacture of photodetectors are standard, as indicated above, the present invention improves the process so as to achieve the objectives outlined previously. More specifically, in accordance with the present invention, the host material to be evaporated is a mixture of cadmium sulfide and cadmium selenide in a predetermined ratio which is selected on the basis of the peak spectral response desired. The peak spectral response will vary from approximately $.51\mu$ for pure cadmium sulfide to approximately $.7\mu$ for pure cadmium selenide, with values of approximately $.53\mu$ for 10% cadmium selenide, approximately $.56\mu$ for 25% cadmium selenide, and approximately $.65\mu$ for 75% cadmium selenide. The other characteristics of the device are unaffected by the choice of mixture ratio. Therefore, the spectral characteristics can be tailored to the application without radically altering the fabrication process. A charge of this mixture is placed in an evaporation boat which, in this case, may be made of tantalum, and at this stage has been in the vacuum chamber through the cleaning process. Also in accordance with the present invention, the dopant material used is a noble metal which may, preferably, be silver, which is placed in a carbon evaporation boat which has been in the vacuum chamber during the cleaning process. For the purpose of the present invention, gold or copper can be substituted for silver as the dopant material. At this point, standard evaporation procedures are again used to deposit the thin film.

After pumping the evaporator down to a low pressure of typically $2 \times 10^{-6}$ torr, the evaporation boats are usually out-gassed. The cadmium sulfide-selenide evaporation boat temperature is brought up slowly to 750° C. in steps of 50° C., or roughly 10 amps, in order to avoid rapid out-gassing which would result in spitting of the material. The out-gassing may be observed by an ion gauge of the vacuum system. Before applying another current step, the system is allowed to recover close to its original vacuum. At approximately 750° C., slight evaporation will be noted. At this point, the evaporation boat current is shut off. Since the out-gassing of the silver is minimal, it is done just prior to deposition. During the entire standard out-gassing procedure, the substrates are kept at a temperature of 300° C. to eliminate condensation of any undesirable out-gassed materials. The evaporation sources are also shuttered from the substrates during this period.

As soon as the substrates and system approach room temperature, a pre-evaporation heating cycle is normally started and maintained for 15 minutes at 75° C. During the last two minutes of the heating cycle, both evaporation sources are gradually heated to near evaporation temperature. Upon completion of the heating cycle, the substrate heater is shut off and the substrates are allowed to cool to the deposition temperature, which, in accordance with the teachings of the present invention, is 75°±1° C. The substrate temperature must be maintained at a value within the range from 60° C. to 85° C. At temperatures lower than 60° C., a photosensitive material becomes unstable and its properties generally degrade with time. At temperatures above 85° C., the operating resistivity of the material generally increases to an intolerably high level for functional purposes. It is also necessary to keep the tolerance to ±1° C. of the selected temperature value. Larger fluctuations in the temperature generally result in slow response times in the material, and less reliable reproducibility from sample to sample.

During the cooling period, the temperature of each evaporation boat is increased to the evaporation temperature which, according to the present invention, is 910° C. for the cadmium sulfide-selenide source, and 1080° C. for the silver source. The cadmium sulfide-selenide evaporation boat temperature must be maintained at a value above 850° C. in order to avoid having intolerably high resistivity levels resulting in the material. The only requirement for the silver evaporation boat temperature is that it must be maintained at a value above the evaporation temperature of silver. The temperature tolerances in both cases must be kept to ±2° C. of the selected temperature value in order to avoid slow response times in the material which would otherwise result.

As soon as the substrates reach 75° C., a shutter may be tripped so as to begin the deposition. In accordance with the present invention, the ratio of the cadmium sulfide-selenide evaporation rate to that of the silver is 100:1. The ratio must be within the range from 50:1 to 200:1. If the ratio is less than 50:1, the device becomes unstable, has a poor time response, and too high a resistivity. If the ratio is above 200:1, the change in resistivity with illumination becomes minimal, rendering the device virtually useless as a photodetector. If either copper or gold is used instead of silver, the ratio of evaporation rates would not necessarily be those listed above. To insure a stable, fast-responding, non-light history dependent device with reliably reproducible characteristics from sample to sample, the ratio of the evaporation rates should not be allowed to fluctuate. The cadmium sulfide-selenide deposition rate is, therefore, held constant and is controlled by an ionization type rate monitor. The silver deposition rate is, therefore, also held constant in the present invention, and is controlled by a pre-calibrated current setting for the carbon boat. During deposition, the substrate is shielded from radiation emanating from the evaporation source. This helps to maintain the substrate at a constant temperature during deposition. The temperature of the substrate could also be held constant by utilizing a solid state cooler in conjunction with the apparatus, or by passing cooling water through the substrate holder fixture. The deposition time for a typical run is 10 minutes which results in a film thickness of 1.8 microns. Upon completion of the deposition cycle, the sources are shuttered and then turned off, and the substrates are allowed to cool to room temperature.

At this stage, the square substrates are normally prepared for a post-evaporation firing process. According to the present invention, the substrates, now coated with the vacuum deposited materials, are completely covered with cadmium sulfide photoconductive powder doped with chlorine to a level of at least 100 parts per million, and copper to a level of at least 50 parts per million. Post-evaporation firing with this type of powder will provide reliable reproducibility of the desired characteristics. This powder must be devoid of binder material which physically damages the thin films as they sinter during the post-evaporation firing. Elimination of the binder material from this powder also ensures a nonmoisture sensitive device. These powdered substances are packed tightly into Pyrex glass tubes which, in accordance with the present invention, are then placed into an air furnace for 11±¼ minutes at a temperature of 625±15° C. Since the post-evaporation diffusion process is a time-temperature process, the selection of the time determines the temperature, and vice-versa. The allowable time can be between 2 minutes and 2 hours. If the diffusion time is less than 2 minutes, the dopant atoms cannot acquire their proper positions within the crystal lattice of the host material. If the diffusion time is greater than 2 hours, various physical imperfections in the thin film, as well as mechanical damage, will result. The allowable temperature can be between 500° C. and 700° C., the higher temperatures corresponding to the shorter diffusion times and vice versa. If the diffusion temperature is lower than 500° C., the necessary recrystallization of the thin film will not occur, nor will the dopant atoms have sufficient energy to acquire their proper location within the crystal lattice of the host material. If the temperature is higher than 700° C., the diffusion process occurs too rapidly, and proper control of the process cannot be achieved. If the diffusion process is completed within a matter of seconds it becomes difficult to remove the substrates from the oven at just the right time. It is important to maintain the temperaure to within ±15° C. of the selected value, and the time to within ±¼ minutes of the selected time period. Larger fluctuations will result in a slower response time, higher resistivity, light-history dependency, instability, and unreliable reproducibility from sample to sample. After the diffusion period, the tubes are normally allowed to cool in air before the substrates are taken out. The fired substrates are then usually cleaned off by dipping into a warm (80° C.) dilute solution of acetic acid (10 parts water to 1 part acetic acid) for approximately 5 seconds in order to remove any small particles left from the powder, and any cadmium oxide on the surface of the films. The substrates are rinsed in running distilled water and dried off with nitrogen gas, making sure all water droplets are blown off to the side and not allowed to dry in the central areas. The substrates are than ordinarily subjected to a chemical photoetch process, followed by an electrode evaporation process.

The materials used in the electrode evaporation process are chromium, gold and nickel.

After being photoetched, the square substrate is placed into a stainless steel holder and the metallic evaporation mask is positioned such that the electrodes match up with the photoetched areas. The unit is normally placed into a vacuum chamber which is pumped down to a vacuum of $10^{-6}$ torr, and backfilled with dry argon gas. This flushing procedure is usually repeated once. The chamber is then backfilled with argon to a pressure of approximately 100 microns for glow-discharge cleaning. The power supply is set at approximately 0.7 kilovolt and 60 milliamps during the 5 minutes of cleaning. The chamber is then pumped down to the low $10^{-6}$ torr region and the chromium is evaporated, followed immediately by the gold evaporation. The evaporation process used is typical of the state of the art in electrode deposition. The chromium gold layer is provided for the purpose of furnishing durable electrical connection pads to the nickel, and for thermocompression bonding. After being taken out of the chamber, a stainless steel shimstock which had been covering the center of the photosensitive areas, is removed. All areas of the chromium gold deposits are masked with the exception of the inside edges where the nickel is to overlap the chromium gold. Precautions must be taken to insure that the metallic evaporation mask is in intimate contact with the glass substrate. The unit is placed into a vacuum chamber and the glow discharge cleaning procedure is repeated as before. The nickel is then deposited.

The substrate temperature during deposition is normally monitored by a thin film thermocouple which is built onto the substrate by evaporating simple elements onto a small strip of the substrate material, and annealing in vacuum. The normal method of monitoirng the rate of deposition of the cadmium sulfide-selenide mixture is accomplished by measuring the ion current resulting from the ionization of part of the vapor stream coming from the evaporation boat.

While the invention has been described with respect to a preferred physical embodiment constructed in accordance therewith, it will be apparent to those skilled in the art that various modifications and improvements may be made without departing from the scope and spirit of the invention.

Accordingly, it is to be understood that the invention is not to be limited by the specific illustrative embodiment, but only by the scope of the appended claims:

We claim:

1. A process for making a photodetective device comprising the steps of:
   vacuum depositing a mixture of cadmium sulfide and cadmium selenide of a predetermined ratio onto a substrate;
   simultaneously vacuum depositing a noble metal onto said substrate;
   maintaining the substrate temperature during deposition at a predetermined value;
   maintaining the cadmium sulfide-selenide evaporation boat temperature during deposition at a predetermined value; and
   maintaining the ratio of the evaporation rate of said cadmium sulfide-selenide to that of said noble metal at a predetermined value.

2. The process defined in claim 1 wherein said noble metal is silver, and wherein the ratio of the evcaporation rate of said cadmium sulfide-selenide to that of said silver is at least 50:1 and at most 200:1.

3. The process defigned in claim 2 wherein said evaporation rates of said cadmium sulfide-selenide and of said silver are maintained constant.

4. The process defined in claim 1 wherein the predetermined value of said substrate deposition temperature is within the range from 60° C. to 85° C.

5. The process defined in claim 4 wherein said substrate temperature is maintained to within ±1° C. of said predetermined value within said range.

6. The process defined in claim 1 wherein the predetermined value of said cadmium sulfide-selenide evaporation boat temperature during deposition is greater than 850° C.

7. The process defined in claim 6 wherein said cadmium sulfide-selenide evaporation boat temperature is maintained to within ±2° C. of said predetermined value above 850° C.

8. The process defined in claim 1 wherein:
   said noble metal is silver;
   the predetermined value of said substrate deposition temperature is within the range from 60° C. to 85° C.;
   the predetermined value of said cadmium sulfide-selenide evaporation boat temperature during deposition is above 850° C.; and
   the ratio of the evaporation rate of said cadmium sulfide-selenide to that of said silver is at least 50:1 and at most 200:1.

9. The process defined in claim 8 wherein:
   said substrate deposition temperature is maintained to within ±1° C. of said predetermined value within said range;
   said cadmium sulfide-selenide evaporation boat temperature is maintained to within ±2° C. of said predetermined value; and
   said evaporation rates of said cadmium sulfide-selenide and of said silver are maintained constant.

10. The process defined in claim 1 further comprising the step of post-evaporation firing said photodetective device, said post-evaporation firing step comprising the steps of:
    covering said device with cadmium sulfide photoconductive powder doped with chlorine and couper;
    applying heat to said powder-covered device for a predetermined period of time; and
    maintaining the temperature of said applied heat at a predetermined value.

11. The process defined in claim 10 wherein said predetermined period of time is within the time range from 2 minutes to 2 hours.

12. The process defined in claim 11 wherein said period of time is within ±¼ minute of the predetermined value within said time range.

13. The process defined in claim 10 wherein the temperature of said applied heat is within the temperature range from 500° C. to 700° C.

14. The process defined in claim 13 wherein the temperature of said applied heat is maintained within ±15° C. of the predetermined value within said temperature range.

15. The process defined in claim 10 wherein:
    said period of time is within the time range from 2 minutes to 2 hours; and
    the temperature of said applied heat is within the temperature range from 500° C. to 700° C.

16. The process defined in claim 15 wherein:
    said period of time is within ±¼ minute of the predetermined value within said time range; and
    the temperature of said applied heat is maintained within ±15° C. of the predetermined value within said temperature range.

17. A process for making a photodective device comprising the steps of:
    providing a substrate for vacuum deposition;
    producing cadmium sulfide and cadmium selenide vapors for vacuum depositing a mixture of said cadmium selenide of a predetermined ratio onto said substrate;
    providing a noble metal vapor for simultaneously vacuum depositing a noble metal onto said substrate;
    maintaining the substrate temperature during deposition at a predetermined value;
    maintaining the cadmium sulfide selenide evaporation boat temperature during deposition at a predetermined value; and
    maintaining the ratio of the evaporation rate of said cadmium sulfide selenide to that of said noble metal at a predetermined value.

References Cited

UNITED STATES PATENTS

| | | | |
|---|---|---|---|
| 2,994,621 | 8/1961 | Hugle et al. | 117—201 |
| 3,379,527 | 4/1968 | Corrsin et al. | 117—201X |
| 3,377,200 | 4/1968 | Chamberlin et al. | 117—201 |
| 3,284,235 | 11/1966 | Santen etal. | 117—201 |
| 3,388,002 | 6/1968 | Foster | 117—217X |

WILLIAM L. JARVIS, Primary Examiner

U.S. Cl. X.R.

117—106, 107; 317—234; 96—1.5